United States Patent [19]
Erdmann et al.

[11] Patent Number: 4,576,105
[45] Date of Patent: Mar. 18, 1986

[54] RESCUE EQUIPMENT FOR SUBMARINE VEHICLES

[75] Inventors: Hermann Erdmann, Weyhe; Hermann Ramaker, Stuhr, both of Fed. Rep. of Germany

[73] Assignee: ERNO Raumfahrttechnik GmbH, Bremen, Fed. Rep. of Germany

[21] Appl. No.: 614,521

[22] Filed: May 29, 1984

[30] Foreign Application Priority Data

Jun. 3, 1983 [DE] Fed. Rep. of Germany ....... 3320159

[51] Int. Cl.$^4$ .............................................. B63G 8/24
[52] U.S. Cl. ..................................... 114/333; 114/336
[58] Field of Search ........................... 423/648 R, 352; 114/331, 333, 336, 54; 222/3, 399; 422/120, 305; 280/736, 741, 737; 441/31

[56] References Cited

U.S. PATENT DOCUMENTS

| | | | |
|---|---|---|---|
| 3,670,680 | 6/1972 | Kriedt | 114/333 |
| 3,716,009 | 2/1973 | Strickland | 114/333 |
| 3,797,854 | 3/1974 | Poole et al. | 280/741 |
| 3,942,456 | 3/1976 | Dinglinger et al. | 114/333 |

Primary Examiner—Trygve M. Blix
Assistant Examiner—Edwin L. Swinehart
Attorney, Agent, or Firm—Ralf H. Siegemund

[57] ABSTRACT

The principal element of a rescue equipment for submarine vehicles includes a principal gas generator in which hydrazine is forced through a catalytic reactor causing the hydrazine to decompose and the developed gas is used to blow a ballast tank. The hydrazine is moved into and through the reaction chamber by operation of a second pilot gas generator likewise operating on the principle of decomposing hydrazine and being operated in a regenerative feedback fashion through a differential piston arrangement so that upon an initial triggering the gas developed by the pilot gas generator drives the differential piston so that increasing pressure is available for driving auxiliary hydrazine through the reaction chamber of the pilot gas generator until a stable operating point is attained. This operating point is automatically adjusted to the effective water pressure against which the principal gas generator has to operate to thereby render blowing time of the ballast tank independent from the depth of the vehicle.

13 Claims, 4 Drawing Figures

RESCUE EQUIPMENT FOR SUBMARINE VEHICLES

BACKGROUND OF THE INVENTION

The present invention relates to rescue equipment for submarine vehicles which include a gas generator, which in turn utilizes a chemical and/or catalytic reaction of a liquid medium for producing a gas, the gas establishes the requisite buoyancy for example in emergency cases or otherwise. Particularly the invention relates to equipment of such type, wherein a liquidous reactant is forced into a reaction chamber by means of a propelling gas in order to obtain the reaction.

Equipment of the type to be improved by the present invention is disclosed for example in U.S. Pat. No. 3,942,456. Generally speaking, rescue equipment of the type to which the invention pertains is or should be part of the equipment of a submarine vehicle to be put into use in an emergency situation, when the vehicle is submerged. The purpose is to develop a pressurized gas which is capable of forcing the water out of the diving compartments and ballast tanks, because for example the usual pumping equipment does not work. This way, buoyancy is developed on an ad hoc basis, having the purpose to cause the vehicle to surface in the shortest possible time.

In furtherance of the objective a liquidous medium, such as hydrazine or the like, is normally contained in a particular container, and that container is physically connected to a source of pressurized gas, but being normally separated therefrom. In the case of an emergency the pressurized gas causes that liquidous medium to be forced into and through a reaction chamber being filled with a particular catalyst. The gas used for such a purpose is usually nitrogen or helium, stored in an appropriately designed high-pressure vessel.

Of course, it has to be realized, that the gas that is developed through the catalytic decomposition, has to work against the water pressure in the dive cells or ballast tanks and that water in turn has to be moved out of the vehicle into the surrounding sea so that the work to be performed depends on the depth and the static sea pressure around the vehicle. Obviously the deeper the vehicle has dived, the higher that force has to be. The above mentioned patent suggests a compensation of that depth pressure by causing the container for the liquidous medium to be decomposed, to be subjected to the pressure of the surrounding water. In other words, this emergency equipment is depth dependently pressurized, so that the developed gas pressure is simply added on and will thus be effective independently from the surrounding water pressure.

DESCRIPTION OF THE INVENTION

It is an object of the present invention to provide a new and improved rescue equipment which includes chemical and/or catalytic decomposition of a liquid medium for the generation of gases, the medium being forced into and through a reaction chamber by an auxiliary gas source, and this structure is to be configured so that the total blowing period as to the ballast tanks at the respective depth is made as short as possible, but not only the blowing period is to be minimized over the entire depth range of the vehicle, a consistently constant period is attainable even if the vehicle still dives further.

It is another object of the present invention to provide a new and improved rescue equipment of the type mentioned in the introduction of this specification, causing reduction in volume, weight, and cost.

In accordance with the preferred embodiment of the present invention, it is suggested to provided two separate gas generators, wherein the first one is constructed essentially as is known per se and the second one is associated with a feed back and amplifier configuration having its input controlled by the actual pressure of the gas as produced by the second generation and having its output side constructed for controlling the operation of this second, pilot gas generator. The operational characteristics of feed back and amplification, is adjusted under a critical degree of coupling, as far as the depth range to be considered is concerned, such that the pressure in the storage vessel is matched to the respective diving depth, for obtaining a constant blowing period, particularly of the ballast tanks in compartments of the vehicle, to be independent from the depth. In other words, the pilot gas generator establishes regeneratively a driving and propulsion pressure, for driving the decomposable medium through the principal reaction chamber in a manner which is independent from the back pressure from the ballast tank.

Both gas generators are preferably constructed for operating on the basis of gas generation through chemical decomposition, either through chemical reaction or catalytic decomposition. The feed back and amplification structure includes a differential piston system, connected to the respective storage vessels of the two gas generating systems, whereby the piston acting upon the pilot or auxiliary generator has a smaller effective cross section. The two pistons should be arranged in a concentric relation to each other and form a single piece configuration. The pilot gas generator may in fact be integrated in the inner piston of the differential piston system. In order to initiate the operation of the pilot gas generator, the larger one of the two pistons is acted upon by a pressurized cold gas. Alternatively, the larger piston is acted upon by the water pressure in the environment for initiating a rescue operation. From an overall point of view, a modular construction is preferred.

It can thus be seen that the inventive rescue equipment provides construction and principles for the operation under utilization of an auxiliary or pilot gas generator which establishes an immediate availability of propulsion gas for operating the principal gas generator under consideration of the fact that the requisite power increases with depth. The regenerative feed back operation of the pilot generator makes sure that its propulsion operation remains independent from ballast tank pressure (as reflected back into the principal gas generator) so that the rate of gas production and ballast tank blowing is independent from diving depth.

A rather robust construction of the vehicle and of the rescue equipment and a sufficient amount of decomposable medium is of course required. Therefore on that basis, the operability of the inventive rescue equipment does not have any operational depth limit. Even in those depths in which the vehicle is subjected to such external high pressure that it may begin to be deformed in a plastic fashion, one still has available a functional and operational rescue equipment which hopefully is still able to surface the vehicle in time. From a practical point of view, the only limitation is any external damage of the ballast tanks. That of course is independent from the operability of the inventive rescue equipment and system.

A particularly safe and constructively simple solution to the stated problem and an adaptation of the overall design principle to particulars is to be seen if the second, pilot gas generator is initiated or triggered if the pressure of the surrounding water is used as a propelling agent. In this case, the system can actually be started without having to rely on a particular trigger pressure source; operability begins at depth below about 5 meters. This of course means, that an accidental triggering of this rescue equipment while the vehicle is surfaced is impossible, because the environmental water pressure is simply insufficient to trigger the auxiliary or pilot gas generator. The modular mode of construction, of course, permits rapid exchange of individual components, which facilitates maintenance and its logistics.

DESCRIPTION OF THE DRAWINGS

While the specification concludes with claims, particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a perspective view of a detail as indicated in FIG. 2; and

Figure 1:
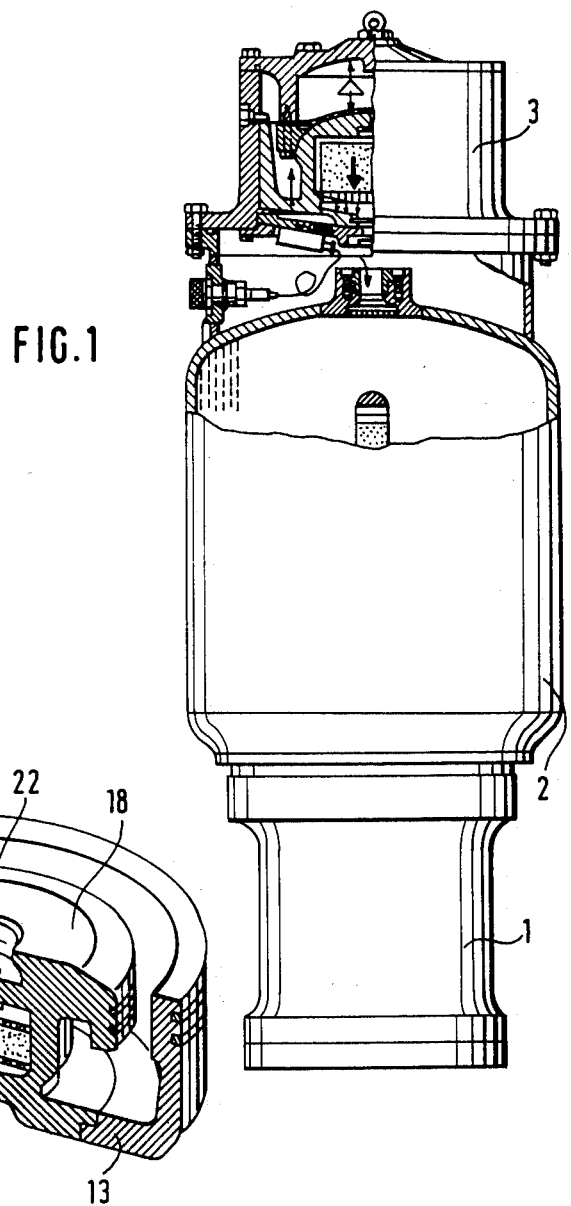
FIG. 1 is a cross section in parts through rescue equipment constructed in accordance with the preferred embodiment of the present invention.

Proceeding now to the detailed description of the drawings, the rescue equipment, illustrated particularly in FIG. 1, is constructed on a modular basis. One can distinguish basically three major components. A primary gas generator module 1; a storage module 2, for storing the liquid decomposable medium, for example hydrazine; and a propulsion unit or module 3. The gas generator module 1 is basically constructed as illustrated and disclosed in the above identified U.S. Pat. No. 3,942,456. In other words, the gas generator module 1 is comprised basically of a reaction chamber filled with a catalyst capable of decomposing on contact the liquidous medium, such as hydrazine. Of course, this reaction chamber is provided with the requisite charge and discharge features, just as disclosed in the above mentioned patent. It is therefore not necessary to describe these components and aspects in greater detail. The following description is concentrated on the propulsion and driving module 3, as well as on the storage module 2 to the extent necessary. Furthermore, the description will readily illustrate how the gas generator unit, as per said patent, can be integrated and combined with these novel components.

Figure 2:
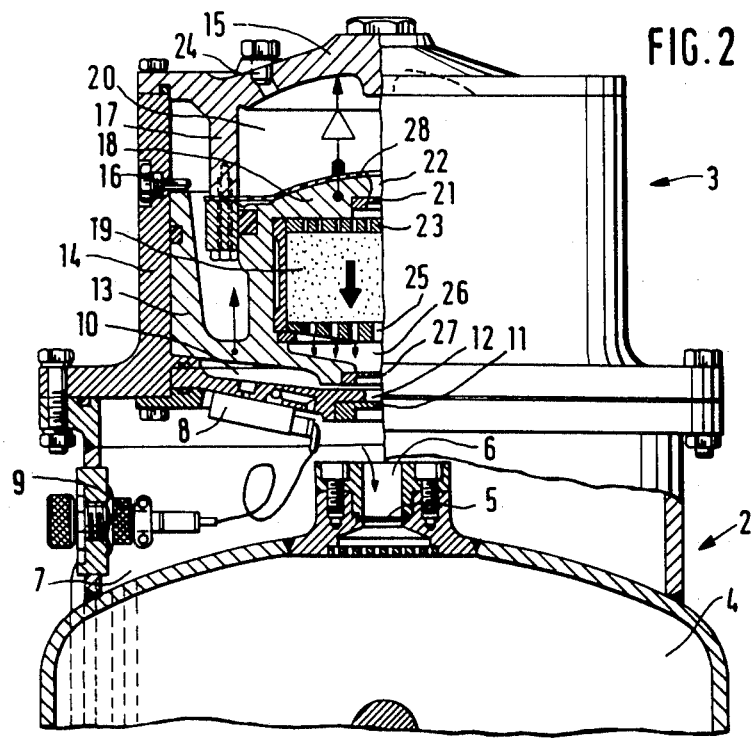
FIG. 2 is a cross section on an enlarged scale through a portion of FIG. 1.

FIG. 2 in particular illustrates these two modules 2 and 3. The storage module 2, is associated with, or better, is comprised primarily of a storage container 4 which contains the liquidous decomposable medium (hydrazine) and that medium of course, is to be fed at times to the reaction chamber contained in the gas generator module 1. The storage vessel 2 is gas conductively connected with a gas tight or gas proof pressure chamber 7, under utilization of a conduit inlet nipple or sleeve 6. Normally, this communication duct 6 is closed, i.e. the passage between the container 4, and the chamber 7, is normally closed, through a rupture disc 5.

The pressure chamber 7 is in this particular example filled with a pressurized cold gas i.e. a pressurized gas such as nitrogen. A pyrotechnical valve 8, is arranged in the pressure chamber 7, which can be electrically operated through an adjustment structure 9, so as to be actuated from the outside through an electric circuit. This valve 8 when opened connects the pressure chamber 7 with another pressure chamber 10. The two chambers 7 and 10 are separately and additionally interconnected through a duct or channel 12, which however, is normally closed through a rupture disc 11.

The pressure chamber 10 is in its upper part, as far as the illustrated orientation is concerned, limited or confined through a first piston 13, pertaining to a differential piston system. This piston runs along the inside wall of a casing 14 of the propulsion module 3. The casing 14 is flanged, i.e. bolted directly to the storage module 2. A dome like cover 15 closes the casing 14. The piston 13 is arrested in a normal or zero-state through a shear pin 16, which has been threaded into and through the casing wall.

The dome shaped cover 15 has an internal cylindrical extension which establishes the cylindrical wall or chamber for a second piston 18. This piston 18 is the second piston of the differential piston system, piston 13, is of course the first one of that system. The overall effective cross area of the piston 18 is smaller than the effective cross sectional area of piston 13. The smaller piston 18 is concentrically received in the piston 13. A cavity is provided in the center of the piston 18 and this cavity establishes a second reaction chamber 19. The chamber 19 is an essential component of a second gas generator. The second gas generator can be called a pilot or trigger generator. The pilot generator and here particularly its reaction chamber 19 is, as far as dimensions are concerned, considerably smaller than the reaction chamber in the principal gas generator 1. The pilot generator chamber 19 is likewise filled with a catalyst and can be operated by a liquidous decomposable medium. For practical reasons one will choose the same medium, for example hydrazine, but that is not essential in principle. The liquidous medium for operating the pilot gas generator is stored inside of a cylinder 20 of the piston 18. The cylindrical chamber 20 is connected to the reaction chamber 19 through a perforated injection plate 23, as well as an inlet opening 22; the latter opening is also closed through a rupture disc 21.

For feeding the requisite material into the various parts, i.e. for refueling the system an inlet tube or nipple 24 is provided in the cover 15. The reaction chamber is moreover connected to the pressure chamber 10 through a cover plate 25, being provided with suitable flow openings; the connection furthermore includes another pressure chamber 26, which is situated in the bottom portion of the differential piston system. That chamber 26 is likewise closed through a rupture disc 27, but is aligned with opening 12.

The figure illustrates that a shear membrane 28 is provided above piston 18. This membrane 28 is however permeable. Furthermore it has to be observed that the pistons 13 and 18 are provided with suitable sealings and packings. FIG. 3 illustrates in a perspective view more details of a piston assembly for facilitating a better understanding of the configuration of the several parts, and it illustrates in particular a differential piston system as a single piece element but parts 13', 18', 19', and 22' respectively correspond functionally to parts 13, 18, 19, 22 in FIGS. 1 and 2.

The system as described as above, operates as follows. Prior to initiating the system, i.e. triggering the rescue operation, the pressure chamber 7 is filled with nitrogen at a pressure from 1 to 2 bars. The emergency situation is established through an electrical signal operating the valve 8. The valve therefore opens and the nitrogen in chamber 7 can expand into the pressure chamber 10 underneath the first piston 13 of the differential piston system. Piston 13 is thus being activated and causes pin 16 to shear off. As piston 13 is moved upwardly, piston 18 by necessity follows and severs membrane 28.

As the nitrogen expands further into chamber 10, the system of piston 13-18 moves up and the piston 18 forces liquidous hydrazine through the injection plate 23 into the reaction chamber 19 of the pilot generator. This of course requires that the disc 21 ruptures, which will readily occur on account of the rapid pressure build-up thereat.

As hydrazine flows into and through the reaction chamber 19 it is catalytically decomposed and thereby generates a propulsion gas. The gas thus generated ruptures the disc 27 and will be caused to flow into the pressure chamber 10, which is filled already with nitrogen. Consequently the pressure in the chamber 10 increases further and pistons 13, 18 move up further which in turn produces a correspondingly increased injection pressure in cylinder 20. The amplification effect is of course the direct result of the differently large areas of piston 13 and 18. It can thus be seen, that in a regenerative feed back fashion, the pilot generator will in fact build up rapidly a very high pressure.

As soon as the pressure in chamber 10, 20, has increased sufficiently it will cause disc 11 to rupture so that now the pressure in chamber 7 increases drastically, causing rupture, finally, of the disc 5. As soon as disc 5 ruptures, the container 4 will be pressurized by this gas pressure generated in a regenerative fashion through the pilot generator. This feature of course permits the medium in container 4 to advance towards the principle gas generator!

It can readily be seen that the storage facility 4 of the storage module 2 in the present specification corresponds to the tank or vessel 3 in the above identified patent, and the principal reaction chamber disposed underneath, denoted generally with reference numeral 1 in the present specification, corresponds to the facility 4 in the above identified patent. Therefore it can readily be seen that the hydrazine contained in the present chamber 4 will be forced into the reaction chamber of module 1 to be catalytically decomposed, and the resulting gas will be forced into the diving, buoyancy and ballast tanks of the submarine vehicle to expell the water therefrom, permitting the vehicle to surface.

The particular pilot gas generator and the associated equipment will reach a stable working point whenever in its reaction chamber, rated for a particular rated throughput of hydrazine, has attained that output. That throughput or output has to be the larger, the higher back pressure that propagates from the ballast tanks into the system, because as soon as the ballast tank blowing operation commences, the water pressure thereof becomes directly effective in the system throughout, and that of course determines the feed back operation in the pilot generator.

In order to attain this operational point in the storage container 4, one needs a particular volume flow at a particular pressure PT. This driving pressure, or propulsion pressure PT, is effective for driving the hydrazine out of chamber 4, but of course it acts back upon the pressure chamber 10 and therefore affects the piston 13. If this particular working point is exceeded during the basically unstable initial phase, this exceeding is effective in that the injection pressure of hydrazine into the reaction chamber 19 of the pilot gas generator is increased. Since that chamber has attained a particular pressure PC which is higher than the pressure PT in container 4, the pressure gradient is lower as it would result by itself on account of the different piston areas. Consequently the amount of hydrazine injected into the pilot gas generator is reduced which of course means that the operation returns to a stable working point. It is apparent that in case the pressure externally is too low, an increase is produced accordingly. Therefore the operational pressure PC in the reaction chamber 19 of the pilot gas generator is stabily attained and maintained.

The equilibrium value to which the system adjusts depends upon the existing surrounding water pressure as it is effective in the system. On the other hand as a predetermined parameter one has available the respective inlet and outlet cross sections for the various gases and liquids, which of course provide a certain pressure drop. Another design parameter is the piston area differential. The differential piston system together with the system as composed of the various chambers, ducts, etc. establishes a feed back and amplification device for the pilot gas generator, which in turn establishes a below critical operating characteristic for the system, which remains effective over the entire contemplated depth range.

Figure 4:
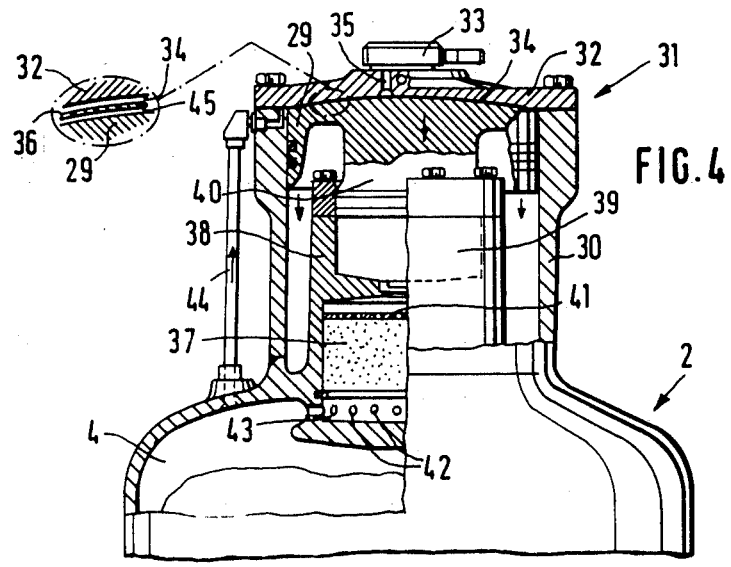
FIG. 4 is a modification still constituting a preferred embodiment for practicing the best mode of the invention.

The particular example in FIG. 4, differs from the one as described thus far in that the initiation or triggering of the pilot gas generator is not made dependent upon an auxiliary reservoir such as chamber 7 in FIG. 3, but is made dependent upon the actual surrounding water pressure. Many components are similar to the one as described and illustrated thus far, but there are also substantial structural differences. The differential piston shown here, includes a first piston 29, which runs in the housing or casing 30 of a module 31, such that it is directly operated by any penetrating ocean water. The dome cover 32 in this case is provided with a pryotechnical valve 33, which connects or separates the external space which the chamber 34 established between the piston 29 and the cover 32, there being an inlet 35 duct accordingly.

The piston 29 is separated from the space 34 through a water impermeable highly elastic (little fatigue) membrane 36. The reaction chamber 37 of the pilot gas generator in this case is arranged inside an extension 38 of the storage module 2. This extension 38 establishes a cylinder 39 for the second piston 40 of the differential piston system. The cylinder 39 receives the liquidous medium for operating the pilot gas generator. Also similar to the first mentioned embodiment, there is an injection plate 41 associated with the reaction chamber 37, as well as a cover or bottom plate 43 having outlet openings 42. Finally, a feedback conduit 44 is provided which connects the storage container 4 for the liquidous medium of the principal gas generator module 1 with the pressure chamber 45 situated between the membrane 36 and the piston 29.

The particular device as described with reference to FIG. 4 operates as follows: The valve 33 is electrically triggered in some fashion, and thereupon establishes a communication between the water in the ballast tank and the pressure chamber 34. The membrane 36 abuts snugly the piston 29. Pursuant to pressure buildup in chamber 34 on account of the entering water from the ballast tank, the differential piston system is moved down, i.e. in the direction towards the reaction chamber 37 and therefore forces the hydrazine out of cylinder 39 into the reaction chamber 37, which is likewise filled with the catalyst just as described; this then triggers and starts the pilot-generator.

The gas obtained through the catalytic decomposition in the pilot generator flows through the outlet openings 42 into the storage container 4 of the storage module 3. Simultaneously gas flows through the feedback conduit 44 into the pressure chamber 45 between the membrane 36 and the piston 29. On account of the amplifying effect of the differential pressure as it acts upon the piston 29, the system will run up until a particular working pressure is obtained which depends strictly not only on the dimensioning parameters of the system but directly also on the water pressure in the ballast tank. With still further inceasing output pressure from the pilot generator, the membrane 36 will abut from the inside against the cover 32, and will in fact force the water out of the pressure chamber 34. Further operation continues just as described above, i.e., the hydrazine contained in the chamber of vessel 4 is forced into the reaction chamber of the primary gas generator module 1 wherefrom the decomposed gas is forced into the ballast tank.

Another possibility can be considered which is not described in detail, but is well within the scope and purview of the invention as delineated by the two examples, and this is a combination of the two operating principles. Alternatively, each of the two pilot generators can be started by providing a solid material trigger or device or through a gas cartridge which can be initiated from the outside, and it is suggested to arrange these elements such that the gases produced therewith act upon the piston with a larger cross section, and that will likewise initiate the described operation.

The invention is not limited to the embodiments described above, but all changes and modifications thereof not constituting departures from the spirit and scope of the invention are intended to be included.

We claim:

1. In a rescue equipment for submarine vehicle, a gas generator device for blowing ballast tanks including a storage facility for a liquidous decomposable medium and a first principal gas generator; an auxiliary propulsion facility for driving the liquidous medium into the principal gas generator comprising:

a second, pilot gas generator;

feedback and amplification means having an input connected to be responsive to gas pressure generated by the pilot generator and having an output effective for controlling the operation of the pilot generator; and the pilot gas generator being connected for driving the liquidous medium out of its storage facility.

2. Rescue equipment as set forth in claim 1 wherein said feedback and amplification means regeneratively increases an output pressure provided by said pilot gas generator until stable conditions are established wherein pressure in the storage facility and in the feedback means reflects ballast tank pressure as it depends upon depth of the vehicle.

3. Rescue equipment as in claim 1 wherein said second pilot gas generator includes a catalytically or chemically active reaction chamber, initiating means for providing a triggering pressure to initiate gas production by the second pilot gas generator, said feedback and amplification means being responsive to output pressure as produced by the second pilot gas generator and augmenting said triggering pressure for liquidous medium through the reaction chamber of the second pilot gas generator.

4. Rescue equipment as in claim 3 wherein said feedback and amplification means includes a differential piston arrangement having a larger area piston provided to be subjected to output pressure from the second pilot gas generator while the second smaller area piston provides pressure for driving liquidous reactant into the reaction chamber of the pilot gas generator.

5. Rescue equipment as in claim 4 wherein said two pistons are concentrically arranged and constructed in single piece configuration.

6. Rescue equipment as in claim 5 wherein said reaction chamber of that second pilot gas generator is disposed inside of the inner one of said pistons.

7. Rescue equipment as in claim 4, said initiating means being a gas reservoir available for applying its pressure in an emergency instance to said larger one of said pistons.

8. Rescue equipment as in claim 4 wherein said initiating means includes means for subjecting the larger one of said pistons to environmental water pressure.

9. In a rescue equipment for a submarine vehicle, a gas generator device for blowing ballast tanks including a storage facility for a liquidous decomposable medium and a first principal gas generator; an auxiliary propulsion facility for driving the liquidous medium into the principal gas generator comprising:

a second, pilot gas generator including a reaction medium;

a differential piston arrangement having a first, smaller piston provided for forcing said medium from said auxiliary storage facility through the reaction chamber of said pilot gas generator, the pilot gas generator having an output provided for communication and gas feeding into the storage facility of the principal gas generator; and a second larger area piston constructed for operating said first piston and provided for being subjected to gas pressure developed by said second pilot gas generator to thereby augment pressure for driving the auxiliary decomposable medium into the reaction chamber of the second pilot gas generator; and means for initiating movement of said second piston.

10. Rescue equipment as in claim 9 wherein said reaction chamber is disposed inside said first piston.

11. Rescue equipment as in claim 9 wherein said second pilot gas generator and its reaction chamber is disposed directly and affixed to said storage facility of the principal gas generator.

12. Rescue equipment as in claim 10 wherein said second piston has an opening through which the gas from said gas pilot generator flows to become effective as regenerative actuator for moving the two pistons.

13. Rescue equipment as in claim 11 including a feedback pipe connecting said storage facility with a chamber to be effective on said larger piston.

* * * * *